Dec. 31, 1929.   C. W. LYNCH   1,741,785

CHAIN TIGHTENER

Filed Oct. 28, 1927

INVENTOR
C. W. Lynch,
BY Thorpe & Thorpe
ATTORNEYS.

Patented Dec. 31, 1929

1,741,785

UNITED STATES PATENT OFFICE

CHARLES W. LYNCH, OF PERRY, OKLAHOMA, ASSIGNOR TO WILLIAMS IRON WORKS COMPANY, INCORPORATED, OF TONKAWA, OKLAHOMA

CHAIN TIGHTENER

Application filed October 28, 1927. Serial No. 229,480.

This invention relates to chain clamps and has for its object to provide a construction whereby chains may be drawn tight without dismounting them from the mechanism they are designed to hold or to operate, so that slack may be provided for the removal of links to shorten the chain or for any other repair purposes, of such nature that the device will positively retain the slack at any desired point without danger of the slack being suddenly lost through slippage of the device.

Another object of the invention is to provide a device of the character outlined which has certain safety links or locks to positively guard against the accidental slippage of the chain links off the clamp jaws, which with a large and heavy chain may lead to the injury of the operator or the parts of the mechanism.

A further object of the invention is to produce a device of the character outlined which is composed of the minimum number of parts and is of very strong, durable, efficient and comparatively inexpensive construction and in which the moving or sliding jaw is so held and guided that there is practically no chance of its catching or binding in operation.

With the general objects named in view, the invention consists in certain novel and useful features of construction and organization of parts as hereinafter described and claimed; and in order that it may be fully understood, reference is to be had to the accompanying drawing, in which:

Figure 1:
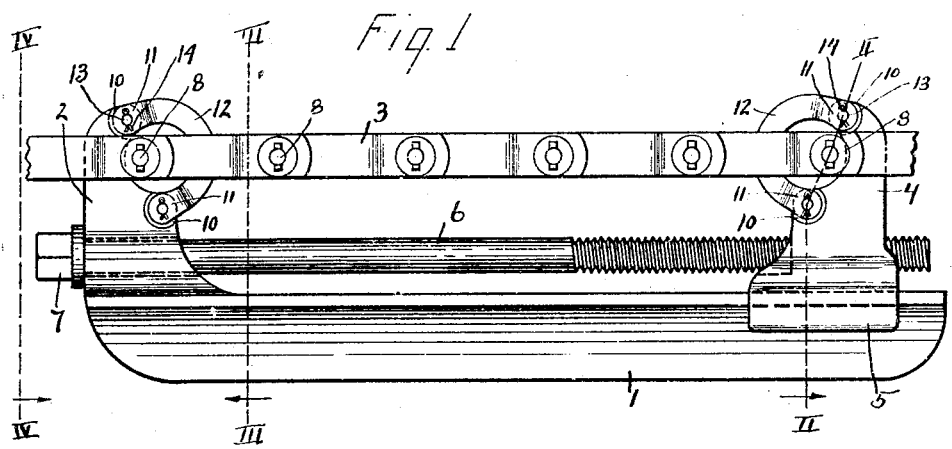
Figure 1 is a side view of a device embodying the invention as it will appear prior to the tightening operation.

In the said drawing, where like reference characters identify corresponding parts in all of the figures, 1 indicates a relatively T-shaped body member of strong and sturdy cross section and of any desired length, said body being formed integrally at one of its ends with an upright jaw 2 of such size that it may be readily passed through a link in a chain 3 as illustrated.

Figure 2:
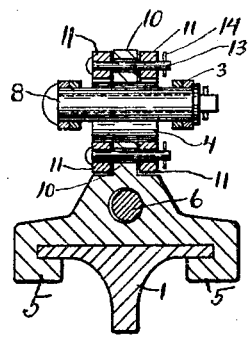
Figure 2 is a section on the line II—II of Figure 1.
Figure 3:
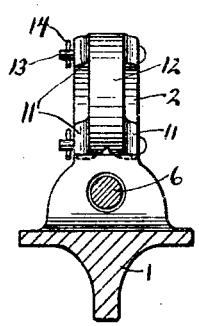
Figure 3 is a section on the line III—III of Figure 1 with the chain omitted.
Figure 4:
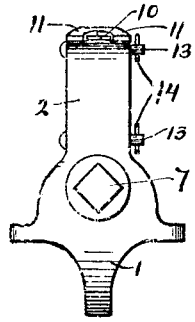
Figure 4 is an end view of the device on the line IV—IV of Figure 1 with the chain omitted.

Adapted to slide on the T-shaped body member 1 is a sliding jaw 4 corresponding in shape and size to the jaw 2, the base portion thereof resting on the cross head of the T base and being formed with a pair of flanges 5 embracing the base or body member as shown in Figure 2. The flanges 5 have a sufficiently close fit on the T head as to prevent the jaw 4 from canting or tipping when being slid thereon, but not being sufficiently tight to prevent or hinder free sliding movement. The T-shaped base in cooperation with the flanges 5 also has another function as will hereinafter appear.

To provide means for drawing the movable jaw 4 toward the fixed jaw 2 the latter is formed with bore or passageway through which a threaded screw or bolt 6 extends, the head 7 of the bolt being in abutment with the face of the jaw 2 and the threaded portion of the screw being engaged with a threaded passageway in the jaw 4.

After the jaws 2 and 4 have been engaged with a chain by contact with cross pins 8 thereof, it will be evident that upon properly rotating the screw 6, the head 7 thereof being in abutment with the fixed jaw, such movement will pull the sliding jaw 4 along the base 1 and supply slack in the chain between the jaws 2 and 4. Upon the application of power to tighten the chain it frequently occurs that there is a rotary twist placed on the chain tending to turn the ends thereof in opposite directions, but by the interlocking engagement of the flanges 5 with the cross head of the T-shaped base 1 this twisting strain is equalized and the chain tightener will not tend to twist or rotate with the axis of the chain as a center.

With heavy chains on which it is necessary to apply a very large strain to secure the desired slack, it has frequently occurred that the jaws of the chain tightener would become disengaged from the chain, the ends of the chain kicking back with considerable force and injuring the operator or adjacent machinery. In order to prevent such accidental occurrences, each of the jaws 2 and 4 is preferably formed with a pair of ears 10 in the plane of the vertical axis of the device, said ears 10 being adapted to be received between a pair of ears 11 formed on opposite ends of semi-circular guard links 12, the links 12 and their respective jaws completely embracing a cross pin 8 of the chain, and being held in interlocked position by suitable cross pins 13 and cotters 14, as illustrated. When the guards are employed as described it will be evident that the ends of the chains can never become accidentally detached from the jaws.

It is believed the combustion and operation of the device has been set forth as to obviate further recapitulation, and it is to be understood that while I have described and illustrated the preferred embodiment of the invention, I reserve the right to make all changes properly falling within the spirit and scope of the appended claims.

I claim:

1. In combination with a jaw for chain tighteners of a semi-circular link having detachable engagement with said jaw.

2. In combination with a chain having a cross pin, of a chain tightener jaw in abutment with one side of said cross pin, and a detachable link secured to said jaw and encircling said cross pin.

In testimony whereof I affix my signature.

CHARLES W. LYNCH.